(12) United States Patent
Zapp et al.

(10) Patent No.: US 8,925,769 B2
(45) Date of Patent: Jan. 6, 2015

(54) WIRELESS SPOUT AND SYSTEM FOR DISPENSING

(75) Inventors: Achim Philipp Zapp, Shenzhen (CN); Richard A. Martindale, Vacaville, CA (US)

(73) Assignee: Automatic Bar Controls, Inc., Elgin, IL (US)

( * ) Notice: Subject to any disclaimer, the term of this patent is extended or adjusted under 35 U.S.C. 154(b) by 109 days.

(21) Appl. No.: 13/227,408

(22) Filed: Sep. 7, 2011

(65) Prior Publication Data

US 2012/0211516 A1  Aug. 23, 2012

Related U.S. Application Data

(63) Continuation-in-part of application No. 12/117,230, filed on May 8, 2008.

(51) Int. Cl.
| | | |
|---|---|---|
| *B67D 3/00* | (2006.01) | |
| *B67D 1/00* | (2006.01) | |
| *B65D 25/48* | (2006.01) | |
| *B67D 3/04* | (2006.01) | |
| *G01F 13/00* | (2006.01) | |
| *G01F 15/075* | (2006.01) | |

(52) U.S. Cl.
CPC .............. *B67D 3/0006* (2013.01); *B65D 25/48* (2013.01); *B67D 3/0003* (2013.01); *B67D 3/0041* (2013.01); *B67D 3/041* (2013.01); *G01F 13/006* (2013.01); *G01F 15/075* (2013.01)
USPC ................. 222/567; 222/1; 222/30; 222/641; 222/212

(58) Field of Classification Search
CPC .............. B67D 3/0006; B67D 3/0041; B67D 2210/00091; B67D 3/0051
USPC .......... 222/639, 52, 484, 479, 478, 504, 113, 222/211, 212, 213, 63, 144.5, 500, 563, 222/566, 567, 569; 137/38, 43; 220/287; 215/319; 251/65; 285/12, 148.22
See application file for complete search history.

(56) References Cited

U.S. PATENT DOCUMENTS 2,895,653 A * 7/1959 Giepen ......................... 222/452
3,650,439 A   3/1972 Shimooka
(Continued)

FOREIGN PATENT DOCUMENTS

CN  86103690 A   2/1987
DE  103 05 441 A1  9/2003
(Continued)

OTHER PUBLICATIONS

International Search Report mailed on Jun. 18, 2009, for PCT Patent Application No. PCT/CN2009/000280, 7 pages.

(Continued)

*Primary Examiner* — Paul R Durand
*Assistant Examiner* — Charles P Cheyney
(74) *Attorney, Agent, or Firm* — Kilpatrick Townsend & Stockton LLP

(57) ABSTRACT

Embodiments of the present invention provide a pouring device for a container for the dosing of liquid. The pouring device has various features intended to ease use, including an improved removal and attachment system and a system to identify and visually illustrate selected pour sizes. In a specific embodiment, the pouring device has a colored light or LED indicator system that allows the user to quickly and easily confirm the selected pour size. Embodiments may also include one or more features that ease attachment and removal of the pouring device to a liquid container, such as a replaceable cork system.

11 Claims, 7 Drawing Sheets

(56) References Cited

U.S. PATENT DOCUMENTS

| | | | |
|---|---|---|---|
| 3,827,467 A | | 8/1974 | Henley et al. |
| 3,920,149 A | * | 11/1975 | Fortino et al. ..................... 222/1 |
| 3,940,036 A | * | 2/1976 | Parker ........................... 222/530 |
| 3,993,218 A | * | 11/1976 | Reichenberger ................ 222/30 |
| 4,261,485 A | | 4/1981 | Borg |
| 4,265,370 A | | 5/1981 | Reilly |
| 4,349,042 A | | 9/1982 | Shimizu |
| 4,436,223 A | * | 3/1984 | Wilson ............................ 222/36 |
| 4,653,719 A | | 3/1987 | Cabrera et al. |
| 4,660,744 A | * | 4/1987 | Csaszar ......................... 222/147 |
| 4,736,871 A | * | 4/1988 | Luciani et al. .................. 222/25 |
| 5,044,521 A | * | 9/1991 | Peckels ........................... 222/23 |
| 5,255,819 A | | 10/1993 | Peckels |
| 5,255,822 A | * | 10/1993 | Mease et al. .................... 222/63 |
| 5,318,197 A | | 6/1994 | Martindale et al. |
| 5,379,916 A | | 1/1995 | Martindale et al. |
| 5,505,349 A | * | 4/1996 | Peckels ......................... 222/641 |
| 5,527,295 A | | 6/1996 | Wing |
| 5,603,430 A | * | 2/1997 | Loehrke et al. .................... 222/1 |
| 5,947,167 A | | 9/1999 | Bogen et al. |
| 6,036,055 A | | 3/2000 | Mogadam et al. |
| 6,220,484 B1 | * | 4/2001 | Martindale .............. 222/153.06 |
| 6,394,411 B1 | | 5/2002 | Hafner et al. |
| 6,409,046 B1 | | 6/2002 | Peckels |
| 6,554,589 B2 | | 4/2003 | Grapes |
| 6,892,166 B2 | | 5/2005 | Mogadam |
| 7,272,537 B2 | | 9/2007 | Mogadam |
| 7,900,799 B2 | * | 3/2011 | Kuzar et al. ..................... 222/52 |
| 8,410,753 B2 | | 4/2013 | Opolka |
| 8,695,858 B2 | | 4/2014 | Zapp |
| 2001/0011025 A1 | | 8/2001 | Ohki et al. |
| 2002/0171559 A1 | | 11/2002 | Yang |
| 2004/0210405 A1 | | 10/2004 | Mogadam |
| 2004/0211790 A1 | | 10/2004 | Werth |
| 2005/0263547 A1 | | 12/2005 | Jensen et al. |
| 2006/0027268 A1 | | 2/2006 | Zapp |
| 2009/0230157 A1 | | 9/2009 | Lindberg |
| 2009/0277931 A1 | | 11/2009 | Zapp |
| 2010/0174337 A1 | | 7/2010 | Stahmann |
| 2011/0016968 A1 | | 1/2011 | Eichholz |
| 2011/0036873 A1 | | 2/2011 | Peckels |
| 2011/0255996 A1 | | 10/2011 | Wickstead |
| 2011/0309103 A1 | | 12/2011 | Heatherly et al. |

FOREIGN PATENT DOCUMENTS

| | | |
|---|---|---|
| EP | 1227058 A1 | 1/2002 |
| GB | 582032 A | 11/1946 |
| GB | 1001208 A1 | 8/1965 |
| JP | 2000-161533 A | 6/2000 |
| WO | 8607625 A1 | 12/1986 |
| WO | 93/19349 A1 | 9/1993 |
| WO | 2007/144002 A1 | 12/2007 |
| WO | WO 2011/133783 A2 | 10/2011 |

OTHER PUBLICATIONS

Non-Final Office Action mailed on Mar. 14, 2011 for U.S. Appl. No. 12/117,230, 5 pages.

U.S. Appl. No. 13/227,418, filed Sep. 7, 2011 for Zapp.

Office Action of Mar. 13, 2012 in related U.S. Appl. No. 12/117,230.

International Search Report and Written Opinion mailed Feb. 15, 2013 in related International Patent Application No. PCT/US2012/053955, 9 pages.

International Search Report and Written Opinion mailed Mar. 15, 2013 in related International Patent Application No. PCT/US2012/053917, 11 pages.

Notice of Allowance mailed Aug. 13, 2013 in related U.S. Appl. No. 13/227,418.

Office Action mailed Sep. 23, 2013 in related U.S. Appl. No. 12/117,230.

Chinese Office Action dated Apr. 8, 2013 in CN Application No. 200980117618.3.

Final Office Action mailed Apr. 10, 2014, in U.S. Appl. No. 12/117,320 (13 pages).

International Preliminary Report on Patentability mailed Mar. 20, 2014, from PCT Patent Application No. PCT/US2012/053917 (8 pages).

International Preliminary Report on Patentability mailed Mar. 20, 2014, from PCT Patent Application No. PCT/US2012/053955 (5 pages).

Office Action mailed May 22, 2014 from Canadian Application No. 2,847,719 (4 pages).

\* cited by examiner

WIRELESS SPOUT AND SYSTEM FOR DISPENSING

CROSS-REFERENCES TO RELATED APPLICATIONS

This application is a continuation-in-part of U.S. application Ser. No. 12/117,230, filed May 8, 2008 titled "Wireless Spout System for Free- and Pre-Measured Dispensing," the entire contents of which are hereby incorporated by reference.

FIELD OF THE INVENTION

Embodiments of the present invention relate generally to systems for monitoring the amount of liquid poured from liquid containers. Further embodiments relate to systems designed to ease positioning and removal of monitoring systems on liquid containers. Even further embodiments relate to improved systems for indicating selected pour sizes.

BACKGROUND OF THE INVENTION

The amount of liquid dispensed from liquid containers needs to be monitored for many endeavors today. For instance, the management of establishments has long found it necessary to carefully monitor the relationship between liquor dispensed and receipts by controlling the quantity of liquor dispensed from a specific bottle and recording the sale.

A few systems have been proposed to date for measuring and recording the amount of liquid dispensed from liquid containers. One such system includes a spout that is configured to attach to an opening of a liquid container. This spout also uses a portion-control mechanism to control the desired amount of liquid poured from the liquid container. The spout includes a radio transmitter for emitting signals containing activity information. A receiver receives the transmitted signals, and provides these signals to a computer at the establishment that processes the signals into text for viewing.

FIG. 1 shows side-cross sectional view of a free-pour spout shown in US2004/0210405 or related U.S. Pat. No. 6,892,166. This spout is used to be mounted on an open orifice of a liquid container and measures the amount of liquid poured from the liquid container. The spout includes a rigid fluid-flow passageway 305, a breather tube 310, a printed circuit board (PCB) 315 with a number of electronic components, a battery (not shown), an LED (not shown), and an engage switch 340 (including seal/sense switch 350, a spring-biased button 345). Reference numeral 306 shows the direction of fluid flow. The dimensions of the fluid-flow passageway are specifically selected to ensure laminar fluid flow of liquid when the liquid-container (and hence the spout) are inclined at a certain angle (e.g., 20 degrees) past the horizontal axis of the liquid-container. It also has a detection circuit that detects fluid flow through the passageway. In addition, this spout has a measuring circuit that generates data relating to fluid flow when the detection circuit detects fluid flow through the passageway.

In US2004/0210405, a RF Transceiver is provided to communicate with an outside master unit for dispensing data. To measure the pour, a detection circuit is provided to detect a pour event. US2004/0210405 also discloses a breather tube that provides an air inlet (vent) 307 that allows better fluid flow through the passageway. An engage switch (bottle presence bottom) is formed by an on-off button that springs up and seals a sense switch on the PCB when the bottom portion is inserted into a liquid container. When the bottom portion is removed from the liquid container, the on-off button springs back and thereby opens the sense switch.

The spout in U.S. Pat. No. 6,892,166 is free-pour, and it only measures the amount of liquid poured. There is, however, a need to pour the liquid in a controlled and predetermined amount. To avoid excess liquid being poured, an additional control unit outside is necessary to stop it. For example, the system includes an external computer that gathers the data collected by the local computers of the establishments monitored by the system. In some embodiments, the external computer is located outside of all the establishments, while in other embodiments the computer is located within one of the establishments. Even with this additional control unit outside, due to a control time lapse and difference in position between detection and control, it is unlikely to have precise control in pouring of liquid.

US2005/0263547 describes a pouring stopper. In this pouring stopper, a magnetic force within the stopper is provided by a coil which affects an armature so that a gasket at both ends of the rod may be caused to assume two positions. The first position allows filling of liquid from a bottle into a liquid chamber, and the second position is intended to empty the liquid chamber. The magnet arrangement itself, which consists of a coil and a spring-biased armature, is seated in an extension of the liquid chamber. The coil itself is seated externally on a bottle holder, which means that the pouring stopper cannot be used for hand pouring.

WO2007/144002 discloses a pouring stopper for a container, the pouring stopper being opened and closed on the basis of a magnetizable rod or plate moved by a coil. The coil and the magnetizable rod or plate are disposed within the liquid chamber. However, the magnetizable rod and coil use power the entire time that the spout is open, which requires high power consumption. Additionally, the electronic parts are not liquid proof, risking the chance that the liquid may wet or dampen them.

However, due to the large size of the magnetizable rod and the coil to move the magnetizable rod, there is a need for a compact and simple pour apparatus that measures the amount of dispensed liquid in a controlled fashion without requiring manual activation.

Moreover, due to the compact and non-disassemble-able nature of the spout in U.S. Pat. No. 6,892,166, when the energy of the battery is used up, the entire spout should be disposed. Therefore, there is also a need to provide options that allow for reuse of the spout. The embodiments described herein provide options for recharging the battery.

Additionally, it would be advantageous to provide a pouring device with one or more features that allow the user/bartender to confirm the size of the selected pour size. For example, there may be instances when a particular drink calls for a regular pour, but other drinks (or consumer preferences) call for an under pour or over pour. The features described below provide an improved indicator system that quickly and easily conveys the selected pour amount, prior to the pouring event.

Further, it would also be advantageous to provide a pouring device with one or more features that ease attachment and removal of the pouring device to a liquid container (such as bottle with a spout).

BRIEF SUMMARY OF THE INVENTION

One of the benefits provided by embodiments of the invention described herein is that a silicone tube inside the spout is a path for the liquid to pass through from the bottle without any restrictions. Meanwhile, the rest of the components are protected or isolated from liquid and are thus per se not necessary to be liquid-resistant or liquid-proof. This also guarantees a quick and controlled flow of the liquid and avoids any air bubbles to influence the pour precision.

The silicone tube can be easily squeezed to stop the liquid flow. This can be done by a stepping motor, a motor with gearbox, or any other motor or appropriate mechanism.

To ensure that the dosing of liquid from the pour spout is uniform and accurate, it is advantageous that a liquid indicator is sealed into the silicone tube. This makes it possible to register liquid flowing out of the pourer during the entire period of time, whether pre- or not pre-determined.

Specific embodiments of invention generally provide a pouring device for a container for the dosing of liquid, the pouring device including: a) a housing; b) a passage for the liquid within the housing; c) an electrical operated opening/closing mechanism for opening or closing the passage for dosing of a predetermined or registerable amount of liquid, wherein the passage comprises a silicone tube, and the opening/closing mechanism blocks the silicone tube by squeezing the silicone tube in order to close the passage. The silicone tube is normally closed, and the dosing of liquid is activated by the opening/closing mechanism. The silicone tube is enclosed and pressed by a slide in the normally closed condition. The opening/closing mechanism may be operated by a motor.

The pouring device may further have an air inlet valve that is opened for pouring and closed in non-pouring status, driven by motor action. It may further comprise a measuring circuit with multi-angle detection that generates data relating to fluid flow through the passage when the detection circuit detects a pour event. The multi-angle detection is different than the known one or two angle detection. With such multi-angle detection, once the tilt process has started, the flow rate can be exactly determined by the measuring circuit such as every 250 ms permanently. To reach the desired pouring quantity, the pouring by opening the silicone tube will be delayed/adjusted according to the bottle tilt position.

In one embodiment, there is provided a pouring device for a container for the dosing of liquid, the pouring device comprising: (a) a spout housing configured to seal an opening of the container; (b) a conduit extending through the spout housing for liquid passage through the housing; (c) an electrically operated valve disposed within the spout housing for selectively clamping the conduit so that a registerable amount of liquid can be dosed; and (d) an indicator system comprising a series of different visual indicia configured to indicate a selected pour size. In a further embodiment, there is provided a pouring device for a container for the dosing of liquid, the pouring device comprising: (a) a spout housing configured to seal an opening of the container; (b) a conduit extending through the spout housing for liquid passage through the housing; (c) a threaded spout inlet tube extending from a base of the spout housing; (d) an electrically operated valve disposed within the spout housing for selectively clamping the conduit so that a registerable amount of liquid can be dosed; and (e) an attachment system comprising a removable and replaceable cork and a nut, wherein the cork is configured to be secured on the threaded spout inlet tube with the nut.

DETAILED DESCRIPTION OF THE INVENTION

The indicator system with different visual indicia configured to indicate a selected pour size and the attachment system comprising a removable and replaceable cork and nut are described below in detail.

Figure 1:
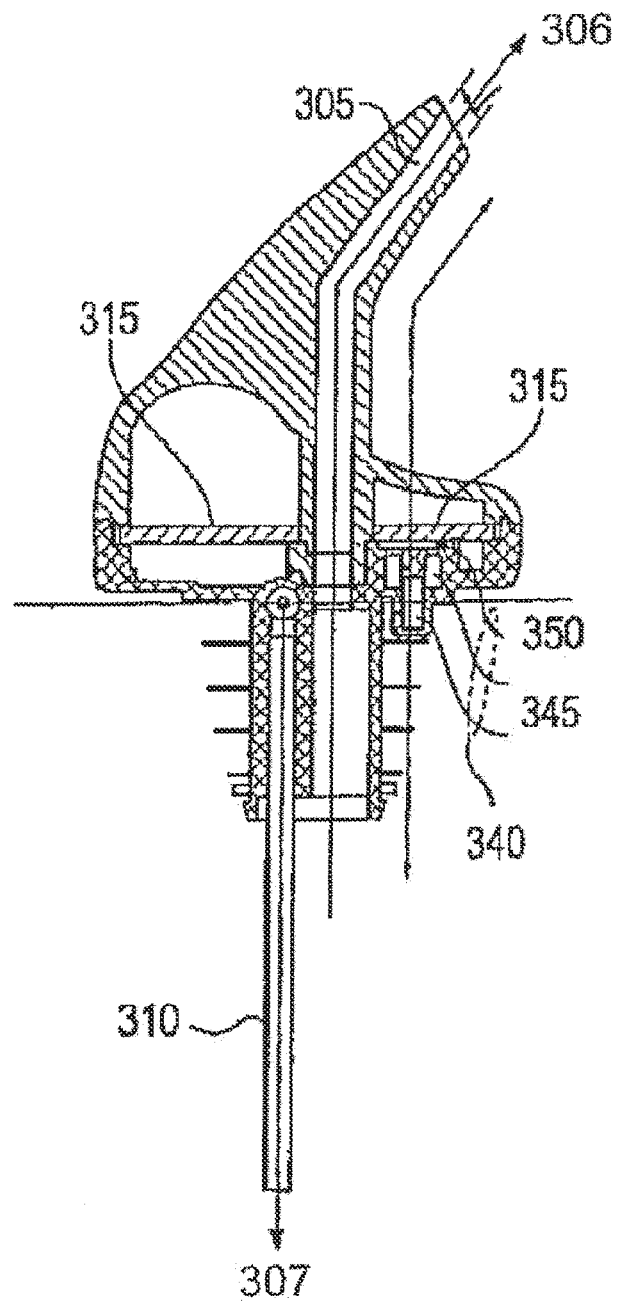
FIG. 1 shows the side-cross sectional view of a free-pour spout in US2004/0210405 or U.S. Pat. No. 6,892,166.
Figure 3:
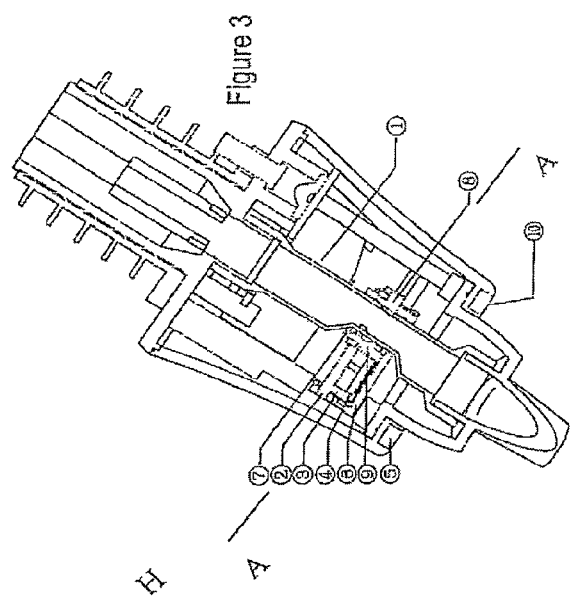
FIG. 3 is the longitudinal section of the pouring device in accordance with one embodiment of the present invention shown in an open position.
Figure 2:
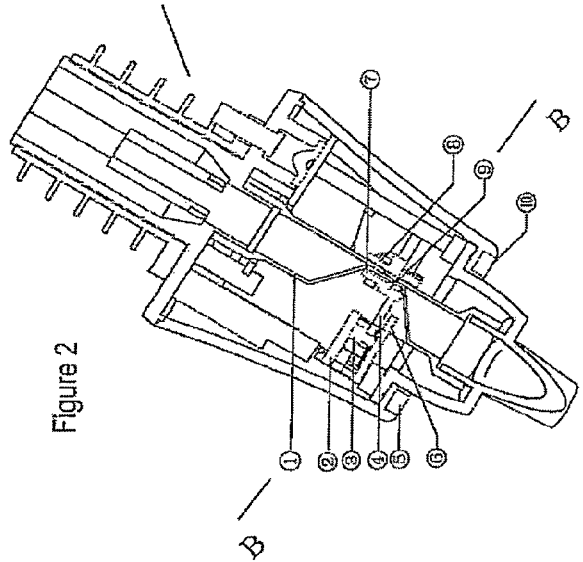
FIG. 2 is the longitudinal section of the pouring device in accordance with one embodiment of the present invention shown in a closed position.

FIGS. 2-5 show a pouring device mounted onto a container (not shown) for dosing of a liquid. The pouring device has a compact housing H configured to seal an opening of the container. A passage (which is at least one portion being in the form of a flexible silicone tube 1 is provided within the housing H for liquid to pass through. An opening/closing mechanism disposed within the compact housing opens or closes the passage in order to dose a predetermined or registerable amount of liquid. In order to close the passage, the silicone tube 1 is squeezed/pressed by the opening/closing mechanism to block the passage. The passage/silicone tube is preferably normally closed as shown in FIG. 2 (but it might be normally open in some cases), and the dosing of liquid is activated by the opening/closing mechanism, which is controlled by a microprocessor (not shown) within the housing.

To ensure that the dosing of liquid from the pour spout is uniform and accurate, it is advantageous that a liquid indicator (not shown) is sealed inside the bottom housing (FIG. 6 & FIG. 7), making it possible to register whether liquid flows out of the pourer during the entire period of time which is pre-determined.

Figure 5:
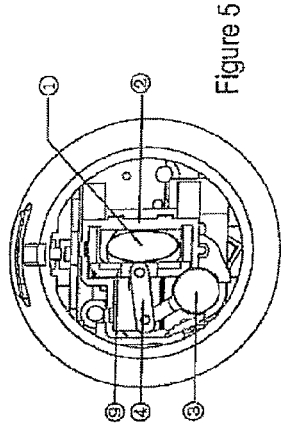
FIG. 5 is the cross-section of the pouring device of FIG. 3 along A-A in an open position.
Figure 4:
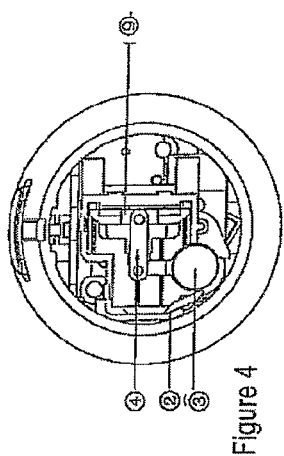
FIG. 4 is the cross-section of the pouring device of FIG. 2 along B-B in a closed position.

As shown in FIG. 2, the silicone tube 1 is enclosed and pressed by a slide 9 and a slide guide 2 (box bottom) and 6 (box top). The opening/closing mechanism is in a normally closed condition (as shown in FIG. 4). FIG. 5 shows the tube in an open position. A motor and a gearbox (not shown) are provided to activate the opening/closing mechanism. The function of the opening/closing mechanism is similar to a pinch valve (see e.g., U.S. Pat. No. 6,554,589), which includes a clamp mechanism operative to clamp a piece of flexible tubing. Generally a clamp or plunger will squash the tubing flat against a surface to cut off the flow of fluid through the tube.

In one embodiment, to close the tube or stop the pouring, the motor turns, for example, clockwise (i.e. from FIG. 5 to FIG. 4), an arm head 3 (rotated by the motor) presses the slide 9 via a pivotally link lever 4 to close the tube 1 into a closed position where liquid is stopped. When the motor turns anti-clockwise (that is, from FIG. 4 to FIG. 5), the arm head 3 is released via the pivotally link lever 4 such that the slide 9 is moved away by the motor and gearbox force to open the tube 1, i.e., in an open position where liquid is dispensing. Moreover, opening of the tube is also due to pressure from the flowing fluid and by the elastic nature of the flexible tube 1 springing back into shape. In the case of dispensing sugar-containing products, the silicone tube walls might glue or otherwise stick together, preventing the tube from going back to its original open position. To avoid this, the outer parts of the silicone tube may have one point fixed 8 (Silicone holder-B) and the other point 7 (Silicone holder-A) that moves always with the slide 9 to enforce the opening of the silicone tube by the slide 9 driven by the motor. The motor is preferably a coreless permanent magnetic DC motor.

In a further embodiment, a pair of springs (not shown) may be positioned between the slide 9 and the slide guide and the arm head 3, directly contacting the slide 9 (i.e., without the pivotally link lever 4) such that in order to open the tube, the slide 9 is pushed away the tube 1 by the pair of springs. Similarly, to close the tube 1 the arm head 3 rotated by the motor and gearbox force would contact the slide 9 against the springs.

In certain embodiments, the opening/closing mechanism may be further controlled by a watch that is worn by the operator until an authorized signal of the watch is received. RF Transceiver in the pouring device may send data together with such authorized signal. Therefore, the system can record who handles such pour.

Figure 8:
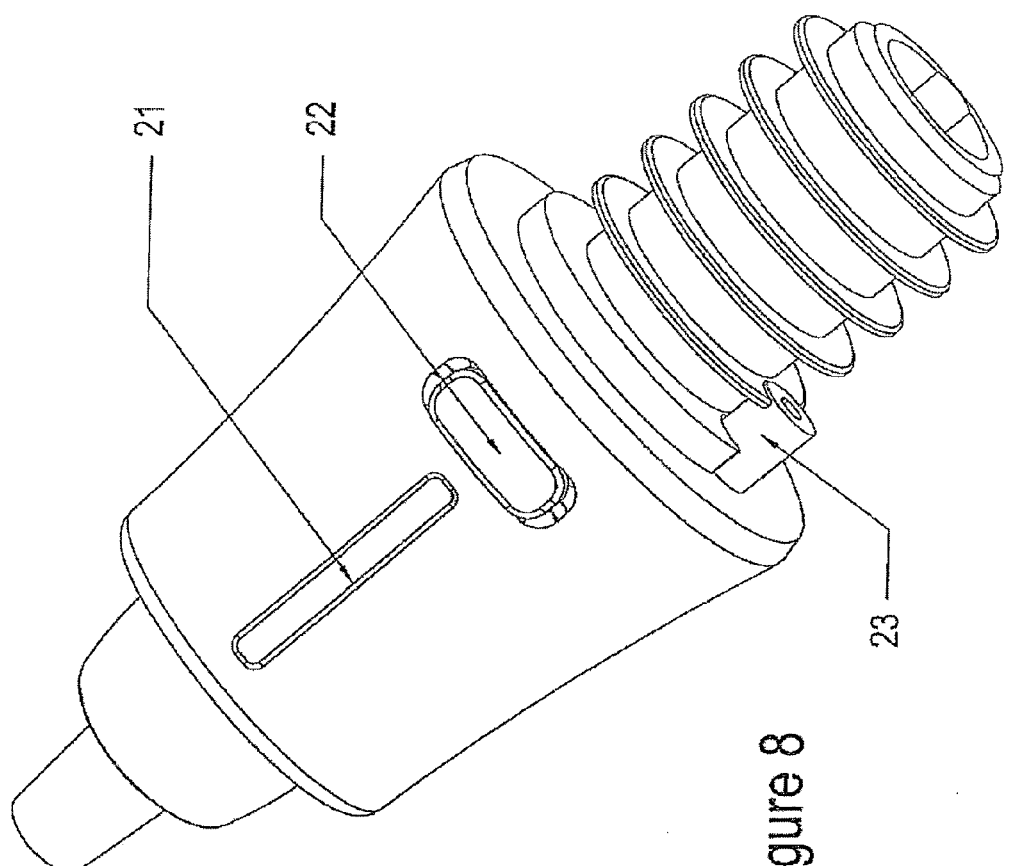
FIG. 8 is a side perspective isometric view of the pouring device of FIG. 2.
Figure 9:
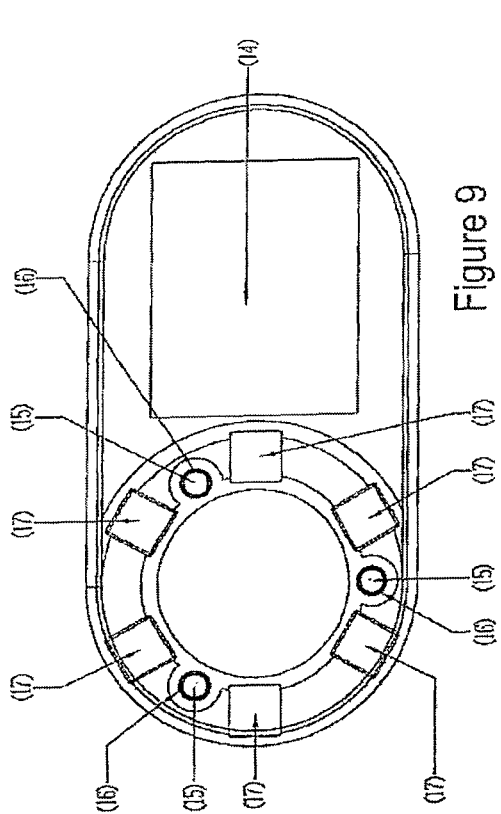
FIG. 9 is the cross-section of a charger for the pouring device.
Figure 10:
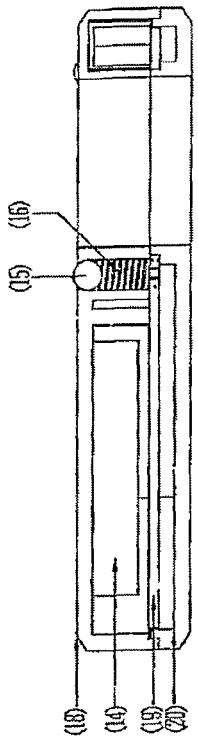
FIG. 10 is the longitudinal section of the charger in FIG. 9.
Figure 11:
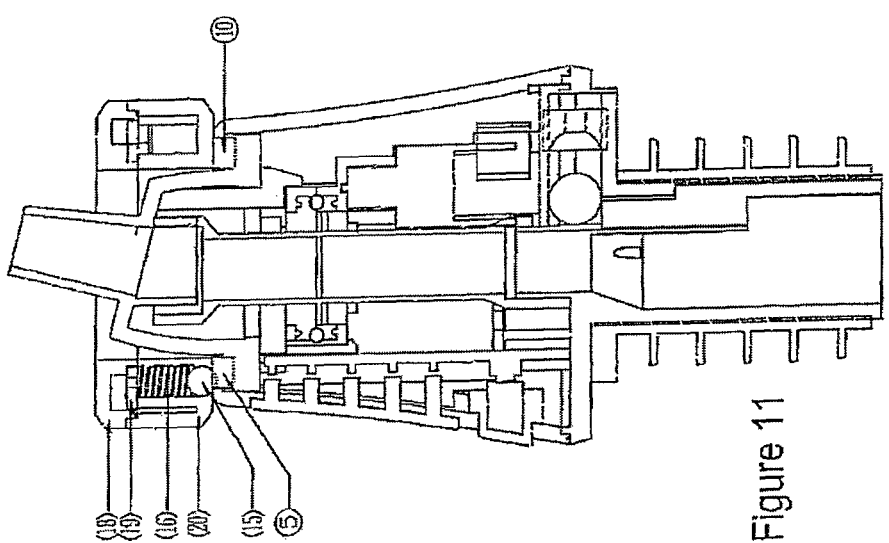
FIG. 11 is the longitudinal section of the charger used with the pouring device.

As shown in FIG. 8, a bottle presence sensor 23 (similar to that described in US2004/0210405) is provided to send an alarm signal when the spout is on or off the bottle, to avoid any pouring without the pouring device. However, due to the compact and non-disassemble-able of the spout described in U.S. Pat. No. 6,892,166, when the energy of the battery is used up, the whole spout needs to be disposed. Therefore, there is a need to be able to reuse the spout, such as by recharging the battery. However, if a power input port is provided on the housing, there is a risk of damaging the electronic parts inside. Thus, as shown in FIGS. 9, 10 and 11, a pair of metal inserts 5 (Charge metal-A) and 10 (Charge metal-B) are provided on the housing for a mobile charger (not shown) to be attached to the spout to charge the battery inside the spout. In a specific embodiment, metal inserts 5 and 10 may be a pair of metal rings or arcuate contacts (in a particular embodiment, the contacts may be steel) on the spout, such that a mobile charger with magnets may be attached to the spout.

A liquid detection indicator is also provided to ensure that the dosing of liquid from the pour spout is uniform and accurate. In accordance with embodiments of the present invention, it is advantageous that the liquid detection indicator is sealed into the bottom housing, as this makes it possible to register whether liquid flows out of the pourer during the entire period of time which is pre- or not pre-determined.

One important duty of a bartender is identifying and selecting the proper pour size. As shown in FIG. 8, the pouring device may be provided with an indicator 21 (such as a series of LEDs) and an activation/selection button 22. The indicator 21 may be a window with a series of LEDs viewable therethrough. The activation/selection button 22 can be silicone rubber which is pressed by the user's finger to actuate the pouring device or to have any selection by consecutive pressing as indicated by the indictor 21. However, to make the pouring device more water-proof and to avoid the activation/selection button 22 from getting pressed stuck by sugar-containing products, a touch-sensor may be used as activation/selection button 22. The indicator 21 and selection button 22 may collectively be used to allow a bartender to identify and select a particular pour size and to confirm that pour size, prior to dispensing the pour. For example, if a half shot size is desired, the bartender may select the half shot option with the activation/selection button 22, and the indicator 21 will reflect the half shot selection, for example, by using one LED light. Each push of the activation/selection button 22 advances the selection up one size. In one particular embodiment, the LEDs may all be of the same color and are stacked vertically up the side of the poring device. It should be understood, however, that any appropriate configuration of the LEDs is possible, for example, longways across the spout, on the top of the spout, or any other location where they are easily viewable by the user.

Alternatively, the indicator 21 may reflect a numeral (e.g., 0.5 or ½ or some other indicator) or an image (a half full shot glass) or any other appropriate image or indicia that will indicate and convey/confirm the selected pour size to the user/bartender. If instead, a full shot is selected, the indicator 21 may reflect two LED lights, the number "1," a full shot glass, or any other appropriate indicator.

Figure 12:
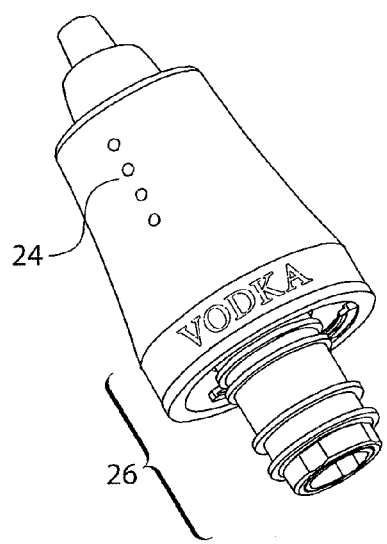
FIG. 12 shows an alternate embodiment of a pouring device having a series of indicators on the pouring device and an improved bottle attachment and removal system.
Figure 12A:
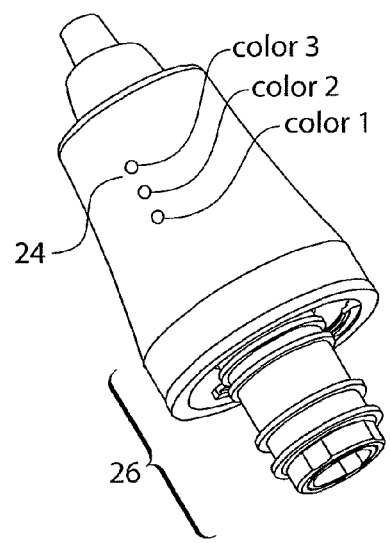
FIG. 12A shows the device of FIG. 12 having indicators or varying colors.

In a further embodiment shown in FIGS. 12 and 12A, the indicator may be a series of differently-colored LED lights 24. Particularly in a dimly lit bar and in the haste of serving a busy crowd, the user/bartender may misjudge or miscount the number of lights or the image shown on the indicator 21. Accordingly, providing a series of differently-colored lights may make it even easier for the bartender to quickly and easily identify and confirm the selected pour size. For example, an under pour (or half shot) may be indicated by a blue light, a regular pour (full shot) may be indicated by a green light, and an over pour may be indicated by a red light, or any other combination of options or pour sizes. For example, it may be possible to add a double pour option that may be indicated by another colored light. Alternatively, the indicator lights 24 may be configured to indicate other pour sizes. For example, a wine bar may wish to pour 3 ounce or 5 ounce tasting sizes, along with an 8 ounce regular glass. The various lights may be used to indicate these differing ounce portions. This is particularly shown by FIG. 12A, which indicates three LED lights, all having a different color, indicated by "Color 1", "Color 2," and "Color 3." Additionally or alternatively, the lights may blink a certain number of times to identify the selection. The general concept is provide an indicator system that has a series of different visual indicia configured to indicate a pour size.

There may be three or four or any other number of indicator lights 24. This different visual indicia embodiment is intended to help the user/bartender quickly select and confirm the current pour size selection by observing the selected pour size LED color, even in a dimly lit, busy location. It gives the user an instantaneous visual realization or confirmation of the selected size.

FIG. 12 also shows that the pour spout may be marked with the particular type of liquid it is intended to be dispense. In this example, the spout is intended for use with a "vodka" bottle because it is marked as such. It may also be marked with a number or other indicia for tracking purposes. For example, the cork may be marked with a size number, as varying bottles having varying neck sizes. As described below, a further embodiment of this invention provides a removable cork system, in order to allow the system to be used with and accommodate various bottle sizes and types.

Figure 7:
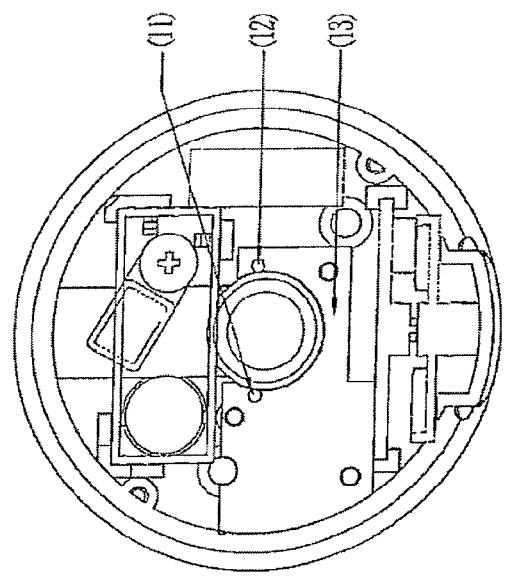
FIG. 7 is the cross-section of the pouring device of FIG. 6.
Figure 6:
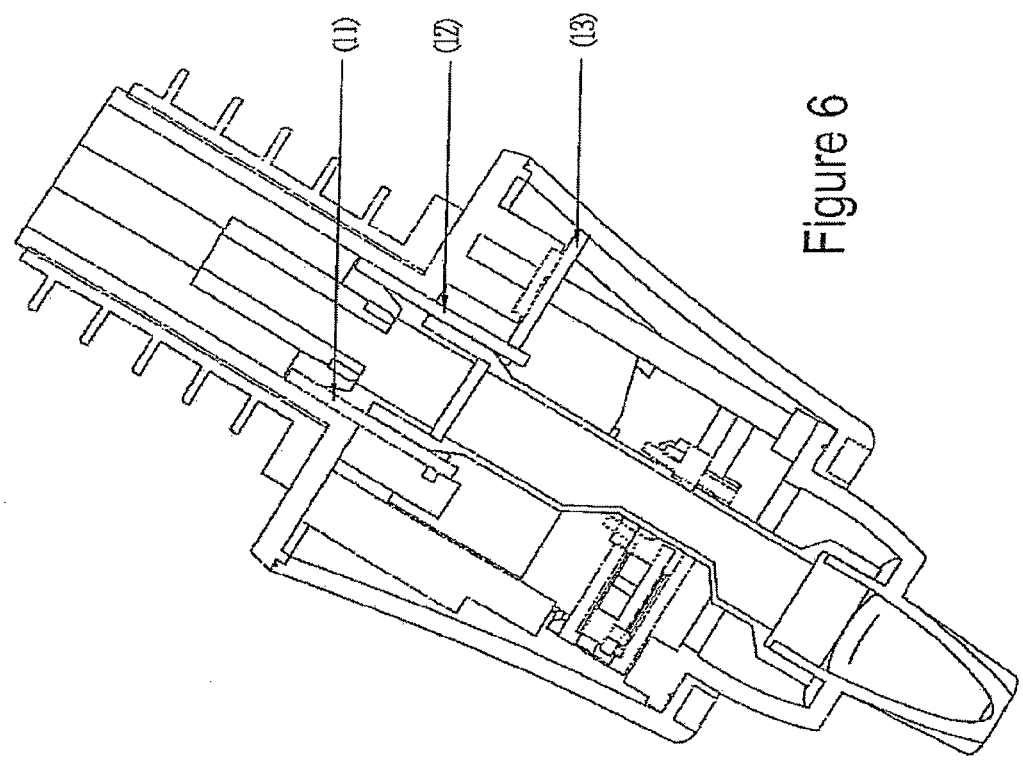
FIG. 6 is the longitudinal section of the pouring device of FIG. 3 showing the position of liquid presence detectors.

FIGS. 6-7 show the position of liquid presence detectors 11, 12 around the silicone tube. A PCB 13 for liquid presence detectors is also provided.

FIGS. 9-11 show a mobile charger used for the pouring device. The charger box bottom is denoted by 18 and the charger box top is denoted by 20. The charger comprises a charger housing with a shape adapted to be mounted on the pouring device (see FIG. 10) to recharge the battery of the pouring device. That is, charger housing has a cavity for the pouring device to be passed through. Around the cavity, several magnets 17 are provided so as to mount the charger firmly to the pouring device by magnetic force with metal inserts 5 and 10 on the pouring device. As in the usual, a charger circuit (indicated as PCB 19) and a battery 14 are provided. Therefore, three circumferentially-spaced charging points are able to detect the two metal inserts in any position such that the pouring device can be recharged in any place by the charger remotely to any electrical power. After the charging of the pour device, the charger can be removed, and then mounted to another pouring device until the power is used up or placed back in recharging station. This allows the pouring device to be recharged remotely, away from a power source. The electric contact between the pour device and charger is via the metal inserts 5 and 10 and the spring contacts (i.e. comprised by metal ball (e.g. steel ball) 15 and spring 16).

Figure 13:
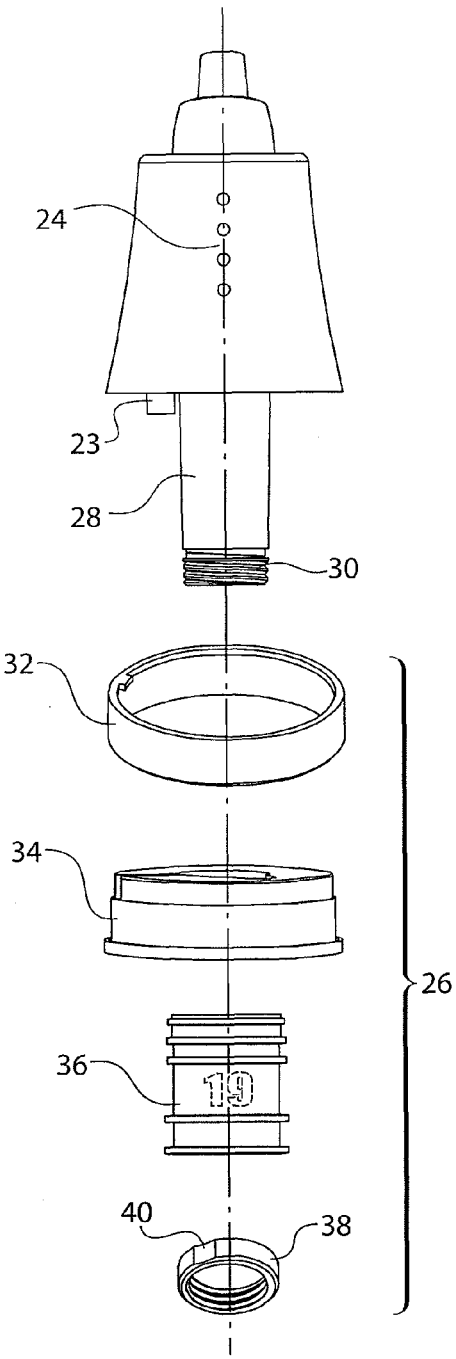
FIG. 13 shows an exploded view of the device of FIG. 12.

Another benefit provided by embodiments of this invention is an improved bottle attachment system. Traditional pour spouts are secured to a bottle using a cork with a tight fit. When the spouts are removed from an empty bottle to be installed on a full bottle, the user often has to twist the spout (with the cork) to break the cork free from the neck of the bottle. More often than not, this twisting action causes the cork to separate from the spout's inlet stem, either staying in the bottle or at least coming loose or partially separating from the stem. Accordingly, FIG. 13 illustrates an improved bottle attachment and removal system 26. This system 26 includes a spout inlet tube 28 with a threaded distal portion 30, a ring 32, a collar 34, a removable and replaceable cork 36 (which may be made of silicone, polyethylene, other food-safe and drink-safe plastics, or any other appropriate material), and a retainer nut 38. The primary components of the attachment and removal system 26 are threads 30, removable and replaceable cork 36, and nut 38. (The ring 32 and collar 34 are optional components that can assist with fitting the cork securely against the spout, reducing any tolerances that may occur, and preventing the cork from hitting the bottle sensor switch by providing appropriate spacing). These components may all be made of food and drink-safe plastics or any other material that has the proper structural integrity to maintain the spout in place while being safe for contact with items intended for human consumption.

The cork 36 has an internal opening or a hollow center portion, which allows it to receive the spout inlet tube 28. In other words, cork 36 can be placed on or over or against the inlet tube, much like a ring is placed on or over or against a finger.

In use, the threaded end 30 of the inlet tube 28 cooperates with internal threads on the nut 38 to maintain the cork 36 in place. This cooperation prevents the cork 36 from disengaging from the inlet tube when the spout is being removed from an empty bottle. This system also allows the cork 36 to be changed or replaced when appropriate. The user may simply loosen the nut 38, slide the nut 38 and cork 36 (and any other components positioned on the inlet tube) off of the tube 28. A new cork may be re-secured in place by tightening the (new or current) retainer nut. This helps lengthen the life of the spout, as well as helps maintain a clean flavor of the liquid to be dispensed. It also allows the same spout to be used with bottles having necks of various sizes. For example, a whiskey bottle of one particular brand may have a larger neck than a tequila bottle of another brand. Being able to exchange cork sizes allows a greater utility for each spout.

In a particular embodiment, the threads 30 may be reverse threads or left-handed threads, which prevents the nut 38 from loosening and/or unscrewing from the threads 30 during the twisting removal of the spout from the empty bottle and replacement on a new bottle.

In a more particular embodiment, the nut 38 may have one or more flat portions 40, which allow the user to easily grasp and twist the nut 38 for its loosening and tightening. This improves the strength of the nut, which may be made of plastic, and can help prevent stripping or slipping during use.

If provided, the ring 32 may act as a spacer that prevents the replaceable cork 36 from hitting the bottle presence sensor 23 (which is illustrated by FIG. 8). The collar 34 maintains spacing and provides a support for the cork 36 against the base of the spout. In a particular embodiment, this design allows for the use of a shorter cork, which can help the user/bartender obtain as much liquid from the bottle as possible prior to changing to a new, full bottle.

Figure 14:
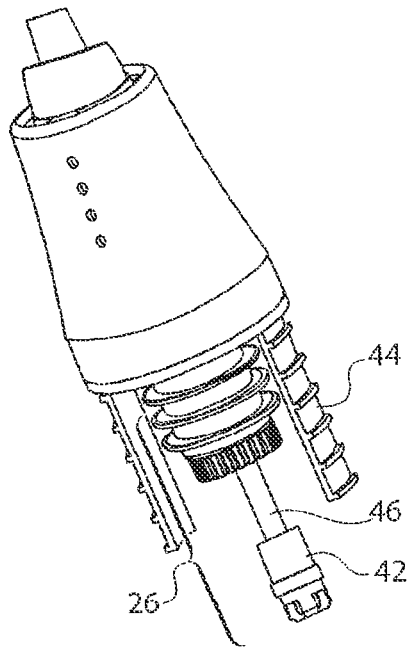
FIG. 14 shows a spout of FIG. 12 having side grip features and an air vent in place.
Figure 15:
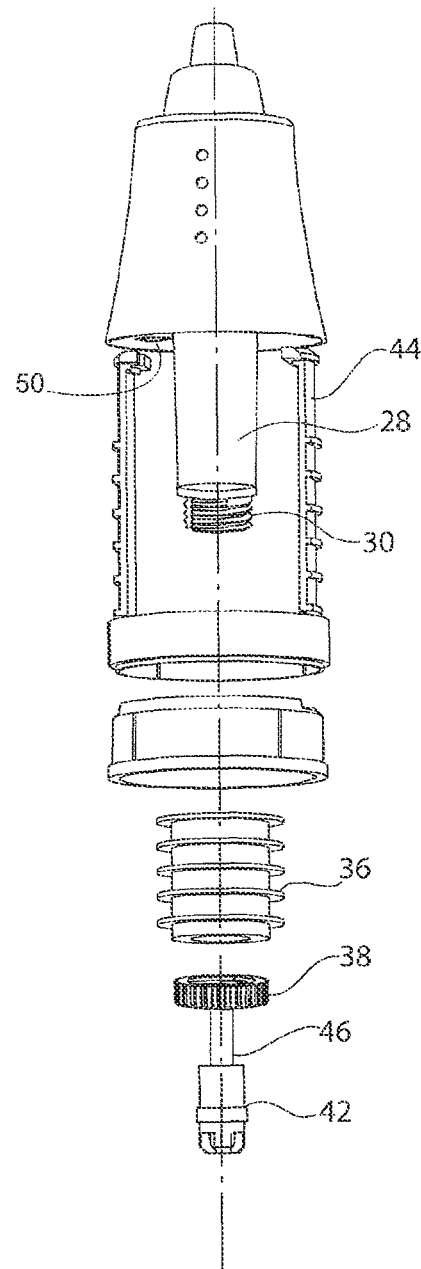
FIG. 15 shows an exploded view of the spout of FIG. 14.

FIGS. 14 and 15 illustrate the spout having the cork attachment and removal system 26, as well as an air valve 42 and security straps 44. Air valve 42 is attached to the spout inlet tube 28 by a thin diameter tubing 46 that is interference fit into both the air valve 42 and into an inlet hole inside the inlet tube. As shown in FIG. 15, securing straps 44 cooperate with receiving portions 50 at the base of the spout. They are useful for securing tape, a security tie, or some other tamper evident feature at the mouth of the bottle. If the tape or tie is broken, this leaves evidence of attempts to remove the spout from the bottle.

It is understood, therefore, that the invention is capable of modification and therefore is not to be limited to the precise details set forth. Various modifications, additions, and deletions may be made in the details within the scope and range of equivalents of the claims without departing from the spirit of the invention and the following claims.

What is claimed is:

1. A pouring device for a container for the dosing of liquid, the pouring device comprising:
   (a) a spout housing configured to seal an opening of the container;
   (b) a conduit extending through the spout housing for liquid passage through the housing;
   (c) an electrically operated valve disposed within the spout housing for selectively clamping the conduit so that a registerable amount of liquid is dosed;
   (d) an attachment system for securing the spout housing to the container, comprising (i) a tube extending from a base of the spout housing and encircling a portion of the conduit extending from the spout housing, the tube comprising a threaded distal portion; (ii) a plurality of removable and replaceable corks in varying sizes, configured to fit bottle necks of varying sizes, each of the corks having a hollow center portion to receive the tube, and (iii) a nut to secure the cork to the threaded distal portion of the tube,
   wherein in use an appropriately sized cork is selected from the plurality of removeable and replaceable corks, and the cork is positioned over the tube, and the nut is secured to the threaded distal portion of the tube below the cork; and (e) an indicator system positioned on the spout housing comprising a series of different visual indicia configured to indicate a selected pour size delivered by the electrically operated valve.

2. The pouring device of claim 1, wherein the nut comprises one or more flat portions on its outer perimeter.

3. The pouring device of claim 1, wherein the cork comprises polyethylene, silicone, or a food-safe plastic.

4. The pouring device of claim 1, wherein the nut comprises plastic.

5. The pouring device of claim 1, further comprising an activation/selection button for selecting a particular pour size.

6. A method for replacing a cork on a pouring device for a container for the dosing of liquid, comprising:

(a) providing a spout housing configured to seal an opening of the container, the spout housing comprising (i) an inlet tube with a distal threaded portion extending from a base of the spout housing and encircling a portion of a conduit extending from the spout housing, (ii) an indicator system positioned on the spout housing comprising a series of different visual indicia configured to indicate a selected pour size, and (iii) an electrically operated valve disposed within the spout housing for selectively clamping the conduit within the inlet tube so that a registerable amount of liquid is dosed; (b) providing a plurality of removable and replaceable corks in varying sizes, configured to fit bottle necks of varying sizes, the corks having hollow center portions; and a nut;

(c) selecting an appropriately sized cork from the plurality of corks, based on a size of the container opening;

(d) positioning the hollow center portion of the selected cork over the inlet tube; and (e) securing the nut against the threaded distal portion of the tube below the cork.

7. The method of claim 6, wherein the selected cork may be removed and replaced with a replacement cork by removing the nut, removing the cork, re-positing a replacement cork over the tube, and re-positioning a new or replacement nut.

8. The pouring device of claim 1, further comprising security straps positioned on the spout.

9. The pouring device of claim 1, wherein the series of different visual indicia configured to indicate a selected pour size comprise differently colored lights, a pictorial image of a pour size, or a specific ounce size.

10. The pouring device of claim 1, further comprising a ring or a collar or both to help secure the cork in place.

11. The pouring device of claim 1, wherein each of the plurality of removable and replaceable corks comprises a series of protrusions along an outer cork surface, wherein the protrusions provide substantially similar diameters along the cork.

\* \* \* \* \*